J. H. MITCHELL.
NUT LOCK.
APPLICATION FILED JAN. 2, 1913.
1,091,889.
Patented Mar. 31, 1914.
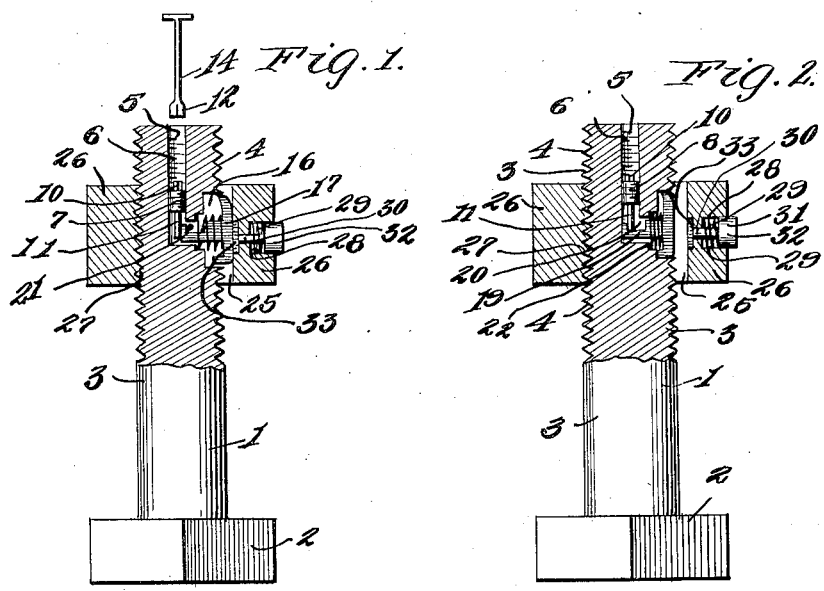
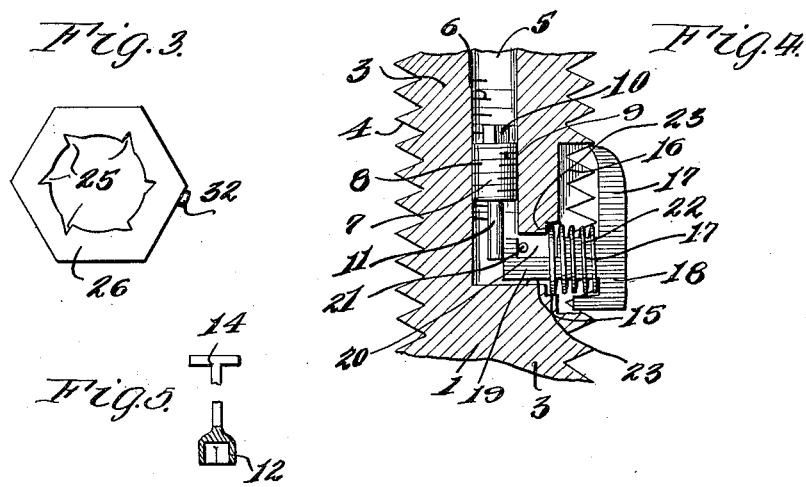
WITNESSES
G. M. Spring.
Robe Meyer.
INVENTOR
Joseph H. Mitchell,
His Attorney

UNITED STATES PATENT OFFICE.

JOSEPH H. MITCHELL, OF TOLEDO, OHIO.

NUT-LOCK.

1,091,889.  Specification of Letters Patent.  Patented Mar. 31, 1914.

Application filed January 2, 1913. Serial No. 739,803.

*To all whom it may concern:*

Be it known that I, JOSEPH H. MITCHELL, a citizen of the United States, residing at Toledo, in the county of Lucas and State of Ohio, have invented new and useful Improvements in Nut-Locks, of which the following is a specification.

This invention relates to nut and bolt locks and more particularly to a nut and bolt lock wherein both a transverse and a longitudinal key are employed.

The primary object of this invention is the provision of a nut and bolt lock that can be easily adjusted in or out of operating position; one with which the removal of the nut from the bolt may be accomplished without the necessity of cutting the nut off the bolt and one in which the nut and bolt as well as the locking means may be used any number of times.

Another object of this invention is the provision of a nut and bolt lock which may be held in an inoperative position and the bolt used in the ordinary manner without being locked.

A further object of this invention is the provision of a nut and bolt lock all of which is internally disposed, having no parts thereof exposed to be broken, bent or subjected to the usual rough usage ordinarily attending a device of this nature.

A still further object of this invention is the provision of a locking means for a nut and bolt which will automatically lock the same when the proper position is reached by the nut upon the bolt and also means for securing the locking member in a locked position when such a position is assumed by the same and means for forcing it into an inoperative or unlocked position when it is desired to rotate the nut upon the bolt or remove the same therefrom.

With the foregoing and other objects in view, this invention consists essentially in the provision of a bolt of the ordinary type provided with a longitudinal, internally threaded aperture, a transverse recess communicating with the longitudinal aperture, a locking member disposed in the transverse recess adapted to be held in a locked or unlocked position by means of a plug or the like which is externally threaded so as to engage the internal threads in the longitudinal aperture in the bolt, a recess in the nut adapted to receive the locking means and a spring pressed button seated in a recess in the nut which forces the locking means out of operative position when it is desired and also of such novel features of construction, combination and arrangement of parts as will be hereinafter more fully set forth, illustrated in the accompanying drawings and claimed.

In describing the invention in detail, reference will be had to the accompanying drawings wherein like characters of reference designate like or corresponding parts throughout the several views, and in which—

Figure 1 is a longitudinal sectional view through the improved nut lock, showing a part of the bolt in side elevation. Fig. 2 is a view similar to Fig. 1, only the locking means is shown in an inoperative or unlocked position. Fig. 3 is a top plan view of the nut. Fig. 4 is an enlarged detail sectional view through the shank portion of the bolt showing the locking means in a locked or operative position, and Fig. 5 is a detail view of a wrench used in connection with the locking means.

In referring to the drawings by numeral, 1 designates the bolt which is of the ordinary type having the head 2 and the shank 3, the outer end of which is provided with external threads 4. The outer end of the shank 3 has a longitudinal recess 5 provided with internal screw threads 6 therein in which is threaded the plug 7. The plug 7 has a body portion 8 which is provided with external screw threads 9 which engage the internal threads 6 of the recess 5 and a lug 10 which is square in cross section projects upwardly therefrom, while the pin 11 projects downwardly from the body portion 8. The square lug 10 is adapted to receive the head 12 of the wrench 14 whereby the plug 7 is raised or lowered in the aperture 5.

The wrench 14 which is shown in Fig. 5 of the drawings and also in Fig. 1 forms no part of this invention but is merely shown because it is necessary to use a wrench of this nature and construction in connection with the nut locking means.

A laterally extending recess 15 being enlarged as is shown at 16 communicates with the lower end of the recess 5 and has the locking member 17 seated therein. The locking member 17 is peculiarly shaped as is clearly shown in the drawings, having a main body portion 18 and a shank 19 projecting at right angles from the body portion 18. The shank 19 has a cut-out portion 20 therein and this cut-out portion 20 receives the pin 11 and holds the locking member 17 in an inoperative or unlocked position as is clearly shown in Fig. 2 of the drawings and when the locking member 17 is in operative or locked position as is clearly shown in Figs. 1 and 4 of the drawings, the pin 11 engages the inner end of the shank 19 and securely holds the member 17 in the locked position. A pin 21 seated in the shank 3 of the bolt 1 forms a means for preventing the member 17 from extending too far out of the bolt.

A spring 22 is disposed around the shank 19 between the main body portion 18 and the shoulder 23 of the recess 15 and tends to hold the locking member 17 in engagement with a recess 25 and the nut 26. The nut 26 is of the ordinary type, having internal screw threads 27 adapted to engage the threads 4 on the shank 3 of the bolt 1 and has a recess 25 formed therein for the reception of the locking member 17. Seated in a recess 28 in the nut 26 is a spring 29. The spring 29 is disposed around the shank 30 of the member 31 and the member 31 has an enlarged head 32 on one end, which is partially seated in the recess 28 and against the inner end of which the spring 29 presses. An enlargement 33 on the inner end of the shank 30 is adapted to bear against and force inwardly the locking member 17 when pressure is applied to the head 32 and forms a means for unlocking the nut and bolt when the plug 8 is raised so that the pin 11 will be out of engagement with the shank 19 of the locking member 17. The nut 26 is provided with a plurality of recesses 25 as is clearly shown in Fig. 3 of the drawings. By adjusting the plug 8 upward and downward in the longitudinal recess 5 the locking means is securely held in or out of engagement with the nut 26 as is clearly shown in the drawings.

In practical fields certain minor features of construction, combination and arrangement of parts may necessitate alterations to which the patentee is entitled provided such alterations are comprehended within the scope of what is claimed.

What is claimed as new, novel and useful is:—

1. In a nut and bolt lock, a bolt having a longitudinal recess and a lateral recess communicating with the inner end of the same, a locking member slidably disposed within said lateral recess, means adjustably mounted within said longitudinal recess for engagement with said locking member and holding it in or out of locking position and a spring-pressed pin carried by the nut and engaging said locking member, whereby the latter may be moved out of a locking position to permit the rotation of the nut upon the bolt.

2. In a nut and bolt lock, a bolt having a longitudinal recess and a lateral recess communicating with the lower end of the longitudinal recess, a locking member slidably disposed within said lateral recess and having a shank formed thereon, a nut being provided with a recess therein, a pin having an enlarged head slidably seated in said recess, the inner end of said pin adapted for engagement with said locking member for moving the same out of a locking position, and means adjustably mounted within said longitudinal recess for engaging said shank and holding said locking member in or out of a locking position.

3. In a nut and bolt lock, a longitudinal recess in the bolt provided with internal threads, a plug provided with external threads, the threads upon said plug engaging the threads in said recess, a shank or pin projecting downwardly from said plug, said bolt provided with a lateral recess communicating with the lower end of said longitudinal recess, a locking member disposed wthin said lateral recess, said pin adapted to engage said locking means and hold it in or out of a locked position, a nut provided with a plurality of recesses threaded upon said bolt, said locking member having an enlarged body portion which is adapted to engage a recess in the nut, a shank projecting at right angles to said body portion, said shank provided with a cut-out portion, said cut-out portion adapted to receive the end of said pin for holding the locking member out of a locked position, said nut provided with a lateral recess, a spring mounted in said recess, a member mounted in said recess, an enlarged head portion upon the outer end of said member, said head portion partially seated in said recess, said spring bearing against the inner end of said head and an enlargement on the inner end of said member which is adapted to press against said locking member and force the same inwardly and out of the recess in said nut.

JOSEPH H. MITCHELL.

Witnesses:
 Steve J. Kaczmarek,
 Stanislaus A. Iwinski.

---

Copies of this patent may be obtained for five cents each, by addressing the "Commissioner of Patents, Washington, D. C."